US006332034B1

(12) United States Patent
Makram-Ebeid et al.

(10) Patent No.: US 6,332,034 B1
(45) Date of Patent: Dec. 18, 2001

(54) IMAGE PROCESSING METHOD INCLUDING STEPS FOR THE SEGMENTATION OF A MULTIDIMENSIONAL IMAGE, AND MEDICAL IMAGING APPARATUS UTILIZING THIS METHOD

(75) Inventors: Shérif Makram-Ebeid, Dampierre; Matthieu Philip, Paris, both of (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/273,281

(22) Filed: Mar. 19, 1999

(30) Foreign Application Priority Data

Mar. 24, 1998 (FR) .................................. 98 03603

(51) Int. Cl.[7] ..................................... G06K 9/00
(52) U.S. Cl. ............................................. 382/128
(58) Field of Search ................... 382/128, 130, 382/131, 132, 171, 173, 174, 277, 284, 285; 378/4

(56) References Cited

U.S. PATENT DOCUMENTS

| | | | |
|---|---|---|---|
| 4,787,906 | * | 11/1988 | Haris .................................. 623/23.72 |
| 5,463,698 | * | 10/1995 | Meyer .................................. 382/276 |
| 5,572,565 | * | 11/1996 | Abdel-Mottaleb ...................... 378/37 |
| 5,574,799 | * | 11/1996 | Bankman et al. ..................... 382/132 |
| 5,647,018 | * | 7/1997 | Benjamin ............................. 382/128 |
| 5,825,909 | * | 10/1998 | Jang ....................................... 382/132 |
| 5,995,668 | * | 11/1999 | Corset et al. ......................... 382/233 |
| 6,081,617 | * | 6/2000 | Bangham et al. ..................... 382/173 |

OTHER PUBLICATIONS

"Nonlinear image analysis for fuzzy classification of breast cancer" By Marroquin, IEEE image processing 1996.*
"A Multiscale Algorithm for Image Segmentation by Variational Method" by G. Koepfler, C. Lopez, J. M. Morel in SIAM, J. Numer. Anal. vol. 31, No. 1, pp. 282–289.

* cited by examiner

*Primary Examiner*—Andrew W. Johns
*Assistant Examiner*—Shervin Nakhjavan
(74) *Attorney, Agent, or Firm*—John F. Vodopia (57) ABSTRACT

The invention relates to a method for the processing of a multidimensional image which is formed by points representing objects of different intensity and are delimited from a background by way of their edges; this method includes steps for the segmentation (100; 30, 40) of the image into cells belonging to the background and cells belonging to the objects, for the application of criteria which impose that said cells ($C_i$) have substantially uniform intensities, that the cells neither intersect nor enclose any object edge, and that the object edges coincide with cells edges; this method includes a step for the presegmentation (30) of the image into a first number of cells while performing a classification of the image points in the various cells as a function of intensity gradients of these points, and an actual segmentation step (40) for reducing the first number of cells by classifying the cells in the form of pairs of adjoining cells ($C_j$, $C_k$), by evaluating a merger threshold ($\lambda_0(j,k)$) for the cells of the pairs as a function of their intensity variance ($\sigma^2$) and of their intensity gradients ($\|G\|$), by evaluating a specific merger threshold ($l_0^P$) below which a predetermined number ($H_0^P$) of adjoining cells of pairs is merged, and by performing the concomitant merger of adjoining cells of pairs whose merger threshold is below said specific threshold.

15 Claims, 6 Drawing Sheets

IMAGE PROCESSING METHOD INCLUDING STEPS FOR THE SEGMENTATION OF A MULTIDIMENSIONAL IMAGE, AND MEDICAL IMAGING APPARATUS UTILIZING THIS METHOD

FIELD OF THE INVENTION

The invention relates to a method for the processing of a multidimensional image which is formed by points representing objects which have an intensity which differs from one object to another, and are delimited from a background by way of their edges, which method includes steps for the segmentation of the image. The invention also relates to a medical imaging apparatus for carrying out the segmentation method, notably to an X-ray apparatus.

The invention is used in medical imaging systems for the three-dimensional display of the vascular system.

BACKGROUND OF THE INVENTION

Herein, a multidimensional image is to be understood to mean, for example, an intensity image formed by points which are pixels arranged in a two-dimensional matrix in space, the intensity of the pixels being a third dimension, or an intensity image formed by points which are voxels arranged in a three-dimensional matrix in space, the intensity of the voxels being a fourth dimension. The segmentation in an image processing method determines segments which are regions of different intensity of the image. The boundaries of the segments are called interfaces.

An image processing method for performing segmentation of an image is already known from the publication "A Multiscale Algorithm for Image Segmentation by Variational Method" by G. Koepfler, C. Lopez, J. M. Morel in "SLAM J. Numer. Anal., Vol. 31, No. 1, pp. 282–299, February 1994". The method described in the cited publication includes the processing of a two-dimensional image which initially comprises regions formed by pixels which are delimited by interfaces and a given number of which has substantially the same intensity. To this end, the method includes a step in which a segmentation algorithm is applied. The proposed algorithm aims to eliminate the largest possible number of interfaces in order to merge adjacent regions whose intensities are practically identical. This algorithm uses a cost function called Energy. The merging of two adjacent regions is possible only in the case in which the Energy function is minimized. This Energy function comprises two terms: a first term which takes into account the intensity variance in each region of the image and a second term which takes into account the total length of the boundaries in the image, weighted by a so-called scale parameter $\lambda$. The execution of the algorithm consists first of all in assigning the value 1 to the scale factor $\lambda$ and in merging two adjacent regions, if any, which minimize the Energy function. The resultant regions are then re-organized by elimination of the interface of the two merged regions, the terms of the Energy function are calculated again and a new attempt for a merger is made, utilizing the scale factor $\lambda=1$. This operation is repeated until there is no longer any region having an adjacent region for a merger when the scale factor $\lambda=1$. After each merger the resultant regions are re-organized by elimination of the interfaces. Subsequently, the same operations are performed with the scale parameter $\lambda=2$, etc., until the Energy function cannot be further minimized. For completion the interfaces of the adjoining regions of different intensity are concretized by way of edges and are plotted in the original image. According to this algorithm, when the term linked to the length of the interfaces has a high cost, there is a tendency to eliminate the interface of the two adjoining regions causing such a high cost, provided that the intensity variance between these regions is small, thus inviting the merging of the two adjoining regions in order to minimize the Energy function. Because the aim is to merge the regions while starting by using the lowest value of the scale parameter $\lambda$, at first the interfaces are not severely treated, so that numerous adjoining regions having a very similar intensity are allowed to preserve their interface for a long time. Subsequently, as the value of the scale parameter $\lambda$ increases, the regions are merged two by two in a slow and gradual manner until the Energy function cannot be minimized further. This algorithm holds for several image scales, hence the names scale parameter or pyramidal parameter $\lambda$.

It is a major problem that the segmentation method known from the cited document is very costly in respect of calculation time, because the regions are merged in a very gradual manner while utilizing first of all the lowest possible value of the parameter $\lambda$ which is subsequently increased slowly step by step, so that the resultant regions, must be reorganized after each merger, involving a new calculation of the terms of the Energy function, so as to attempt anew the minimization of the Energy function and, occasionally, to execute another merger.

An even more significant problem is that it cannot be ensured that a merger between two adjacent regions which have substantially the same intensity but nevertheless belong to different objects will be avoided.

SUMMARY OF THE INVENTION

It is an object of the invention to provide a segmentation method for a multidimensional image which is less consuming in respect of calculation time than the method known from the cited document.

It is another object of the invention to provide such a segmentation method which ensures that on the one hand a background can be distinguished and that on the other hand different objects can be distinguished from one another, regardless of their intensity level relative to one another and relative to the background.

These objects are achieved and the described problems are solved by means of a method for the processing of a multidimensional image which is formed by points representing objects which have an intensity which differs from one object to another and are delimited from a background by way of their edges, which method includes the steps of segmenting the image into cells relating to the background and cells relating to the objects, and of applying criteria which impose that said cells have respective, substantially uniform intensities, that said cells neither intersect nor enclose any object edge, and that the object edges coincide with cell edges.

In one application, the step for the segmentation into object cells and background cells in this image processing method is preceded by steps for the acquisition of two-dimensional (2-D) intensity images of a volume, and for the reconstruction of a noisy three-dimensional (3-D) image, the step for the segmentation of the three-dimensional image into object cells and background cells being succeeded by steps for the reconstruction of a three-dimensional image by way of a method which applies renditions of volumes where each object is attributed the respective individual intensity of the corresponding cell.

In another application, a medical imaging apparatus comprises a system for the acquisition of a sequence of images and an image processing system which has access to the data of the images and to a system for the display of images and includes a processor for carrying out such an image processing method which includes such image segmentation steps.

In one application of this method, the multidimensional image is a medical vascular image.

In a specific application, an X-ray apparatus is associated with such a medical imaging apparatus.

BRIEF DESCRIPTION OF THE DRAWINGS

The invention will be described in detail hereinafter with reference to the accompanying diagrammatic drawings; therein.

DESCRIPTION OF THE PREFERRED EMBODIMENTS

The invention relates to an image processing method for the reconstruction of a three-dimensional image, referred to as 3-D and having a fourth, intensity dimension, from a noisy 3-D image by means of steps which include noise suppression in said 3-D image, presegmentation and segmentation for separating a uniform background rendition from objects having different intensities which, however, may be substantially close to that of the background, and for separating these objects from one another. The steps of this image processing method are illustrated in the form of diagrams with functional blocks in the FIGS. 1A, 1B, 2A, 2B, and 3. The invention can be generalized to images which have one or more spatial dimensions with an intensity dimension; such images are called multidimensional images.

Figure 7A:
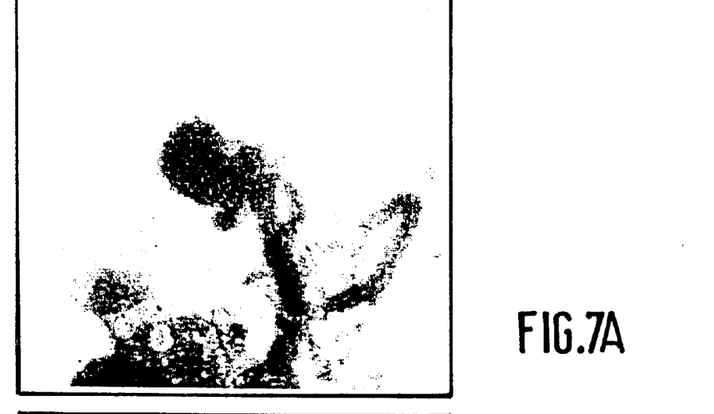
FIGS. 7A, 7B, 7C show a 2-D medical projection image, representing a part of the vascular system of the brain, a 3-D image reconstructed on the basis of several 2-D projections obtained without segmentation treatment, and a 3-D image reconstructed after segmentation.
Figure 7B:
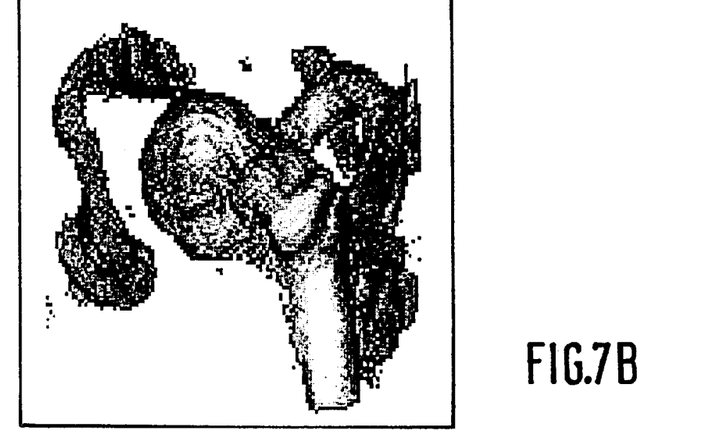

In an example as illustrated in FIG. 7B, the intensity image to be processed is a three-dimensional vascular medical image, so an image formed by voxels having three spatial co-ordinates, a fourth dimension being formed by the intensity of the voxels. In the envisaged application, the image may contain $128^3$ voxels.

Figure 1A:
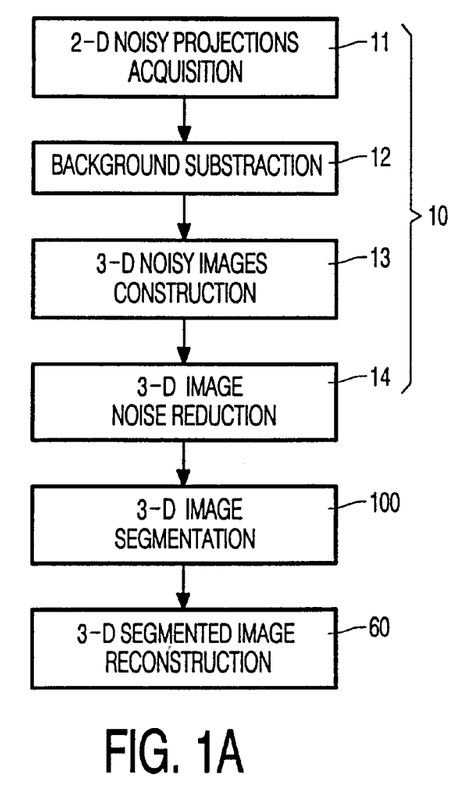
FIGS. 1A and 1B show diagrams with functional blocks representing the steps of a method for the reconstruction of a segmented multidimensional image.

Referring to FIG. 1A, the three-dimensional image 3-D is produced by a reconstruction (10) of vascular images, including the following sub-steps:

acquisition (11) of a given number of two-dimensional X-ray images, referred to as 2-D projections; these 2-D projections, one of which is illustrated in FIG. 7A, are the output signals of an X-ray image acquisition system which rotates 180° in a plane of rotation around a volume formed by a part of the body of a patient, such as the brain, and constitute 2-D images of the vascular system, subtraction (12) of the background applied to the 2-D projections, including:
a first acquisition of these projections at given angles of the plane of rotation after injection of a contrast medium into the vascular system of the patient, a second acquisition, at the same angles, without contrast medium, and subtraction of the intensities of the corresponding projections by means of markers in order to extract the background, resulting in 2-D DSA (Digital Subtracted Angiography) projections, reconstruction (13) of the 3-D image of the vascular system of the brain of the patient by combining the 2-D DSA projections in a suitable manner by means of backprojection methods known to those skilled in the art.

Referring to FIG. 7A, it appears that the 2-D projections make it difficult for the radiologist to distinguish the various vessels of the vascular system. Referring to FIG. 7B, the 3-D image displayed, utilizing a known technique which forms a rendition of voluminal surfaces, is better suitable for making a correct diagnosis. More specifically, while comparing the FIGS. 7A and 7B it appears that the S-shaped vessel at the extreme left in the 3-D image of FIG. 7B is the visible reconstruction of the vessel which is practically indistinct in the corresponding zone of the 2-D image of FIG. 7A. Moreover, such a voluminal image enables the radiologist to "travel" in space, i.e. in the vascular system.

The 2-D DSA projections shown in FIG. 7A are noisy; therefore, the reconstructed 3-D image shown in FIG. 7B is also noisy. This is due notably to the fact that the acquisition system is not perfect, that the distribution of the contrast medium varies during the acquisition, that the registration of the two projections in order to extract the background is not perfect, and that the 3-D reconstruction algorithm itself is not perfect. The imperfections of the image of FIG. 7B are a nuisance to the radiologist wishing to evaluate the presence or the extent of anomalies.

Referring to FIG. 1A, therefore, the reconstructed 3-D image should preferably undergo two optimization phases, being:

a first phase 14 for reducing the noise, a second phase 100 for performing the segmentation.

The first phase 14 for noise reduction utilizes methods which are known to those skilled in the art and will not be described herein. The second phase 100 utilizes a segmentation process for differentiating and subsequently separating first regions, containing exclusively the essential information constituted by the vessels in the envisaged application, and second regions which contain the whole remainder of the image elements, that is to say everything that is not a vessel and is considered to form the background. The first and second separated image regions are called "segments". The segmentation phase 100 thus serves to provide an optimized 3-D image which shows the vascular system on a uniform background.

A specific problem occurs during this segmentation phase 100 because the 3-D image to be segmented may contain on the one hand vessels with a high intensity and on the other hand vessels with a lower intensity which deviates only slightly from the background intensity. Therefore, it is not possible to segment the image into exclusively a class "vessels" and a class "background", for example by applying a simple thresholding operation to the intensity of the voxels. Such a thresholding operation could have several detrimental consequences. First of all, such a thresholding operation might eliminate vessels or details of vessels which have an intensity which deviates only slightly from that of the background but are nevertheless essential specific structures which are different from the background. Moreover, such a thresholding operation might eliminate the small details of vessels or the vessels of very small diameter, because the edges of vessels are not necessarily lines or surfaces of the same intensity, so that given parts of these edges could drop below the selected threshold and be eliminated, so that on the one hand the dimensions and on the other hand the shapes of vessels in the reconstructed 3-D image might be modified.

The present invention proposes a segmentation method 100 which enables an attractive reconstruction of the 3-D image, in which:

all vessels are separated from the background and are preserved with their own intensity in the same 3-D image, irrespective of their different intensity levels relative to the background in the image to be segmented; this is very important so as to make a medical diagnosis of vascular insufficiency;

the dimensions, in particular the diameters, and the shapes of vessels are reproduced very faithfully; this is very important for making a medical diagnosis of the presence of anomalies of a diameter such as stenoses and anomalies of a shape such as aneurysms.

Moreover, the segmentation method 100 according to the invention requires a calculation time which is much shorter than that required by the known method. For example, the segmentation method with a reconstruction of the 3-D image according to the invention can be carried out while using SPARC or ULTRASPARC machines which are known to those skilled in the art and execute the calculations necessary for the reconstruction of a segmented 3-D image of $128^3$ voxels in approximately one minute.

Figure 1B:
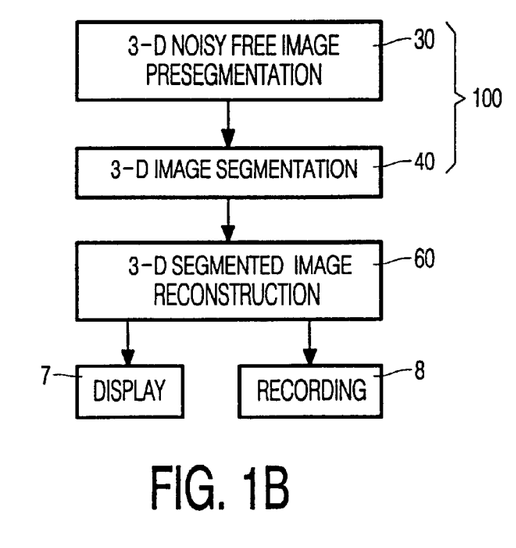

Referring to FIG. 1B, the segmentation method 100 comprises two general steps:

a presegmentation operation 30 which consists in determining in the 3-D image a plurality of elementary, non-geometrical cells which are defined by a first condition which excludes that an elementary cell contains or intersects a vessel or an edge of a vessel, and by a second condition which includes that an elementary cell contains exclusively voxels of substantially identical intensity, an actual segmentation operation 40 in which pairs of adjoining elementary cells of the presegmented image are combined by a merging method in order to form resultant cells while preserving the first condition that a resultant cell neither contains nor intersects any vessel or edge of a vessel, and the second condition that an elementary cell contains only voxels of substantially equal intensity, the merging operation being continued until the image contains a number of cells which has been reduced in comparison with the presegmented image, said number being chosen as necessary and sufficient for separating the vessels from one another and from the background.

Referring to FIG. 1B, these steps are followed by a third general step 60 in which (see FIG. 7C) an optimized 3-D image is reconstructed, for example by means of a voluminal surface rendition method which faithfully reproduces all vessels with their different intensities, dimensions and shapes on a uniform background.

Figure 2:
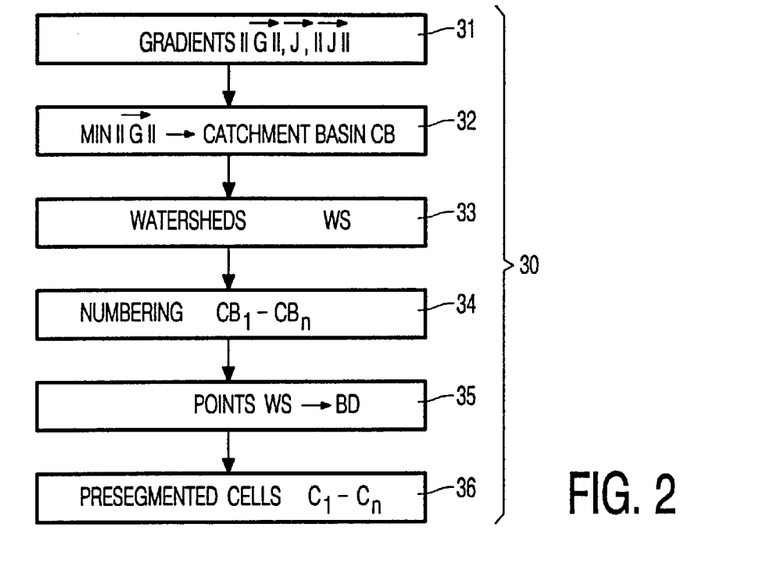
FIG. 2 shows a diagram with functional blocks representing the presegmentation sub-steps of the image reconstruction method.
Figure 5A:
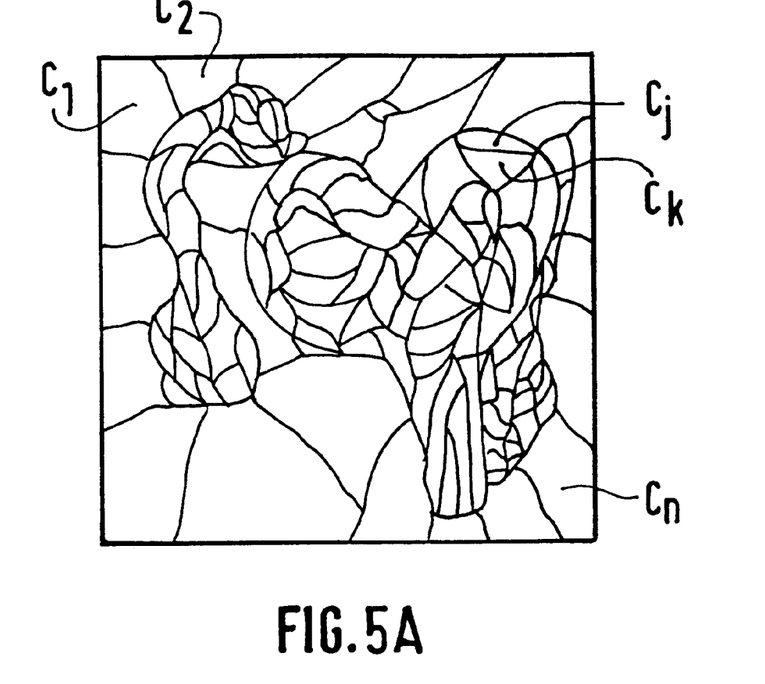
FIGS. 5A and 5B show regions before and after merger, respectively, in a two-dimensional image during the merger step.
Figure 5B:
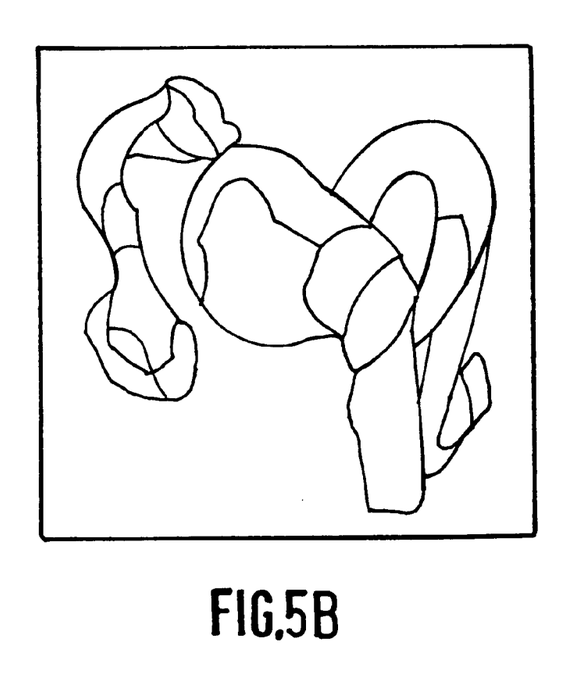

Referring to FIG. 2, the presegmentation step 30 includes a determination of elementary cells as shown in FIG. 5A in a noise-suppressed 3-D image yielded by the step 14, which cells do not have a predetermined shape and satisfy the previously defined first condition that no elementary cell should contain nor intersect vessels or edges of vessels and the second condition concerning the uniformity of intensity. An essential problem thus concerns the localizing of the exact positions of walls of vessels.

In the case of exhaustive, ideal and non-noisy data, the modulus of the intensity gradient, evaluated in a 2-D or 3-D image, differs from zero (0) if this intensity gradient is evaluated in the vicinity of a wall of a vessel. This property may be of assistance in resolving the problem of localizing walls of vessels. However, the solution to this problem is not simple because, in the case of a 3-D image, a wall of a vessel is defined as a set of voxels where the modulus of the gradient reaches a local maximum along its own direction.

Referring to FIG. 2, a suitable solution for solving this problem and for carrying out the presegmentation operation 30 involves a specific method for the classification of voxels, including a transformation of the 3-D image into a topographic image.

Figure 4A:
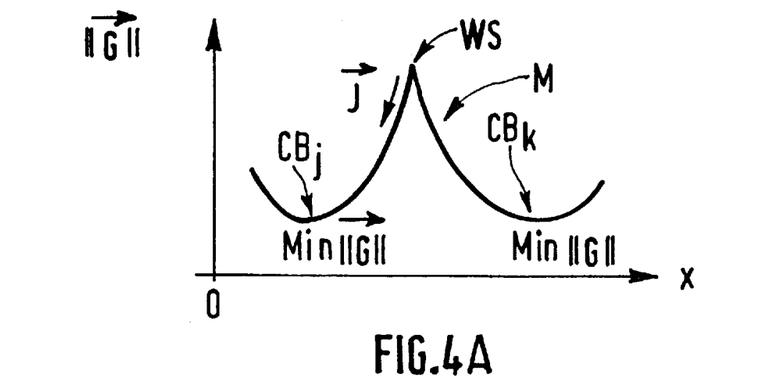
FIGS. 4A, 4B and 4C illustrate the formation of catch basins and the elimination of watershed lines during the presegmentation step.

In the case of a plane or 2-D image, it is easy to represent such an image as a topographic image having three spatial dimensions, the first two spatial dimensions x, y then being those of the 2-D plane image while the third spatial dimension is formed by the intensity I(x,y) of pixels forming reliefs. Analogously, such a topographic image can also be constructed by starting with a 3-D voluminal image in which an intensity function becomes a fourth spatial dimension for the formation of reliefs. In a 3-D image, the moduli of the gradients form surfaces of a topographic image that can be represented and the variations of the moduli of the gradients form the reliefs, being valleys CB or summits WS of the topographic image. FIG. 4A shows such a 3-D topographic image in a sectional view taken along the axis of x. This topographic image contains, for example a mountain M with a summit WS and valleys CB, on which imaginary rainwater flowing along the flanks of the mountain M collects, to both sides of the summit line WS which is the watershed line. Each valley CB to both sides of the summit WS is a hydrographic or so-called catch basin. Catch basins CB are defined as independent classes and a method is defined for the classification of the voxels of the image whereby two voxels are deemed to belong to the same class, i.e. to the same catch basin CB, if the fictitious drops of water falling onto these voxels on a surface of the topographic image reach the same minimum of said surface.

According to this classification method, the voxels which are situated outside any catch basin, i.e. outside any class, are situated on the watershed lines WS, so on the boundaries of the classes defined by the catch basins. It is subsequently decided that the elementary cells C of the presegmented image JPS shown in FIG. 5A are identical to the catch basins CB.

Figure 4B:
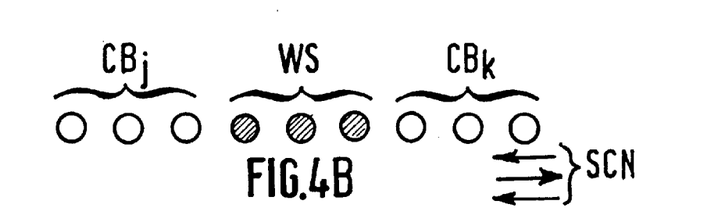
Figure 4C:
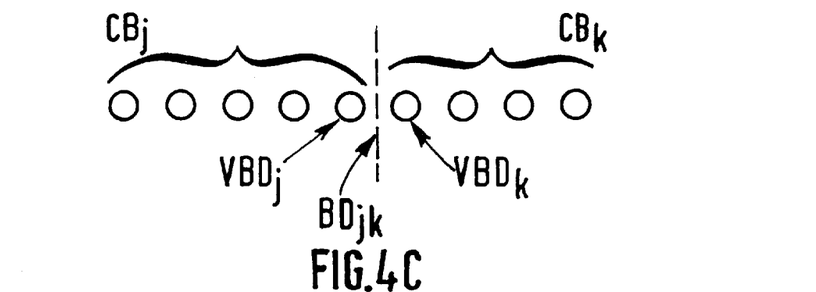

Referring to FIG. 2, in practice the presegmentation step 30 includes the sub-steps of:

determining (31), at each voxel, the modulus of the gradient $\|\vec{G}\|$, a gradient vector $\vec{f}$ of this modulus of the gradient $\|\vec{G}\|$, and its modulus $\|\vec{f}\|$;

determining (32) a class of catch basins CB by following, at each voxel, the direction of the gradient vectors $\vec{f}$ of the gradients $\|\vec{G}\|$ until a local minimum $\text{Min}\|\vec{G}\|$ of the modulus of the gradient $\|\vec{G}\|$ is found, the set of voxels converging towards the same local minimum $\text{Min}\|\vec{G}\|$ of the modulus of the gradient $\|\vec{G}\|$ being regrouped as belonging to the same catch basin CB;

determination (33) of a class of watershed fines WS: the voxels whose gradient moduli of the gradient $\|\vec{f}\|$ cancel one another without corresponding to local minima $\text{Min}\|\vec{G}\|$ and which cannot be assigned to any catch basin CB are thus assigned to the watershed lines WS;

numbering (34) the catch basin CB from 1 to n, denoted as $CB_1-CB_n$;

distributing (35) the voxels of the watershed lines WS in the nearest catch basin CB in such a manner that there are no longer boundary lines formed by voxels but instead catch basin interfaces are found which are called BD and extend between pairs of voxels VBD which are formed by a voxel in each of the adjoining catch basins; as appears from the FIGS. 4B, 4C, the voxels of the watershed lines WS are simply attributed, during the alternating scanning SCN, to the catch basins situated to both sides of the interface BD, deciding (36) that the resultant catch basins, comprising the voxels of the catch basins CB plus the distributed voxels of the watershed lines WS, are the elementary cells searched, having the numbers 1 to n assigned to the catch basins.

As a result of the use of this method of classifying voxels and identifying elementary cells at the catch basins, neither the walls of vessels nor the vessels can traverse the classes of cells or catch basins CB, because the walls of vessels are situated at the boundaries of the classes, i.e. they coincide with the summits WS, so that the vessels themselves form independent classes. Moreover, these walls of vessels can be detected with the precision of detection of the watershed lines. This method of classification and identification thus suitably satisfies the two conditions imposed in the presegmentation step. Referring to FIG. 5A, the image is then formed by elementary cells which are numbered $C_1, \ldots C_i, \ldots C_n$ and do not cross or contain any vessel.

After the presegmentation step 30, the number from 1 to n elementary cells is too large for attractive reconstruction of a 3-D image by voluminal surface rendition. Referring to the FIGS. 1B, 3, an actual segmentation step 40 is then carried out. The segmentation 40 is achieved by application of a merger algorithm to the presegmented image in order to minimize the number of interfaces by linking adjoining cells having similarity properties. This similarity is measured by a cost function F which comprises a sum of two terms. The cost function can in general be written as:

$$F = \sum_{C_i} f_1[\sigma^2(C_i)] + \lambda \sum_{VBD} f_2(\|\vec{G}\|) \qquad (1)$$

and specifically as:

$$F = \sum_{C_i} m_i \sigma^2(C_i) + \lambda \sum_{VBD} 1 \Big/ \left[1 + (\|\vec{G}\|/\|\vec{G}_0\|)^2\right] \qquad (2a)$$

Two adjoining cells can be merged exclusively if this merger results in minimization of the cost function F. The terms of the cost function constitute criteria for reducing the number of cells by merger, subject to the conditions that the intensity of the voxels within the merged cells is substantially uniform and that no cell resulting from the merger contains or traverses vessels.

The first term is a criterion which takes into account the intensity differences of cells resulting from the presegmentation and is formed by a summing function of a function $f_1[m_i\sigma^2(C_i)]$ of the variances $\sigma^2(C_i)$ of the intensities in the various cells $C_i$, where the variances are multiplied by the number $m_i$ of voxels in the cell $C_i$ considered. The variance $\sigma^2(C_i)$ is calculated in each of the cells while taking the mean value of the square of the standard intensity deviation with respect to the mean intensity in the cell. For ease of evaluation of the first criterion, the intensity within the cells is rendered substantially uniform by individually calculating the mean intensity $I_i^{MOY}$ in each cell of the presegmented image and by assigning this mean intensity to each of the voxels of the cell considered. The cost function can thus be written equivalently as follows:

$$F = \sum_{C_i} [I(X,Y) - I_i^{MOY}]^2 + \lambda \sum_{VBD} 1/[1 + (\|G\|/\|G_0\|)^2] \qquad (2b)$$

in which the variance function $f_1(\sigma^2)$ in the first term is the function for summing the squares of the differences between the intensity $I(x,y)$ of a voxel having the co-ordinates x, y and the mean intensity $I_i^{MOY}$ of the cell $C_i$ whereto this voxel belongs. It will be recalled that upon a merger the intensity variance of the cell resulting from the merger is always greater than the sum of the intensity variances of the cells before the merger (statistical rule). Therefore, this criterion disfavors any merger but it is counterbalanced by the second term.

The second term is a criterion which is weighted by a weighting factor $\lambda$ and is formed by a function for summing, over all pairs of voxels situated at the interface of the cells, of a specific measure $f_2(\|G\|)$, taking into account the modulus of the gradient $\|G\|$ at each of the voxels of these pairs at the interface, $\|G_0\|$ being a normalization factor. According to the second criterion, in the adjoining cells the sum $$\sum_{VBD} f_2(\|G\|),$$

taking into account the moduli of gradients $\|G\|$ already calculated, is formed for the pairs of voxels VBD situated to both sides of an interface BD.

For a fixed given value of the weighting factor $\lambda$, this second criterion constitutes a penalty which is more severe as the moduli of the gradients of the voxels of the interface between two cells are smaller. This second criterion thus stimulates the merger of the cells whose interfaces exhibit small gradient moduli because, by way of this merger, the penalty term is minimized, so that the cost function F tends towards minimization, even while taking into account an increase of the intensity variance due to the merger. On the other hand, this second criterion applies a small or zero penalty when the voxels of the interface of two adjoining cells exhibit strong gradient moduli so that there is no stimulus to merge these cells, taking into account the fact that the intensity variance which increases upon the merger prevents minimization of the cost function F. Thus, the separation of the classes of vessels and background can be preserved, because it is known that the modulus of the gradient has a high value at the edges of the vessels.

This type of cost function for performing mergers is not known from the publication cited as the state of the art. According to the invention, the first, presegmentation step determines, on the basis of the watershed lines WS, interfaces BD in very exact locations. The second, segmentation step selects, on the basis of the specific cost function F, on the one hand the parts of the interfaces BD which are truly edges of vessels having an exact location, and on the other hand the various parts of vessels, each of which constitutes a separate class which is suitably separated from classes forming the background by the interfaces BD which coincide with the edges of vessels. Therefore, no class whatsoever can intersect a vessel and no edge of a vessel can be eliminated during a merger.

Figure 3:
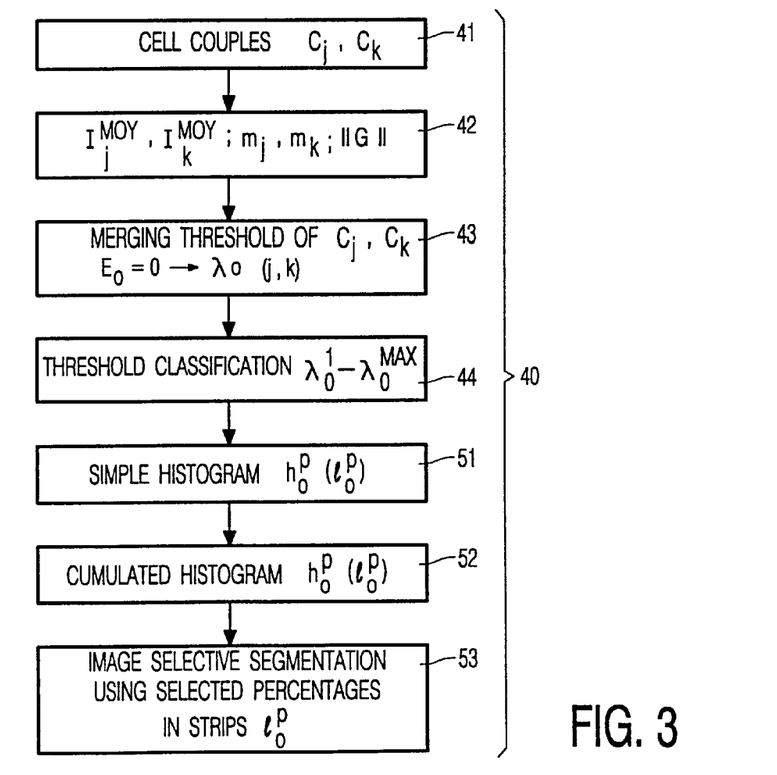
FIG. 3 shows a diagram with functional blocks representing the actual segmentation sub-steps of this method.

During the actual segmentation step 40, mergers of adjoining cells are performed two by two when the voxels of these cells have characteristics which are taken into account by the two criteria, being such that the cost function F is minimized by the merger. If the cost function F is not minimized but increases due to the merger, such a merger is not performed.

It is to be noted that the second criterion of the cost function F is also weighted by a variable weighting factor $\lambda$. In order to carry out the segmentation operation 40 by means of the cost function F, the parameter $\lambda$ must be gradually increased as from an initial value $\lambda_0$. For example, if the value $\lambda_0$ is taken to equal zero, only the first term will be left in the function F and it will be evident that there is no interest whatsoever in merging two cells, because the variance of a merged cell is always larger than the sum of the variances of two individual cells (statistical rule).

The cells having been numbered in advance for $\lambda_0 \neq 0$, all cells $C_1$ to $C_n$ which adjoin one another and hence form pairs are visited. For each pair the function F operates a competition between the first term, relating to the variance, and the second term, relating to the inverse of the modulus of the gradient of the voxels of the interface, weighted by the factor $\lambda$. As has already been stated, the first term, concerning the variance, increases in the case of merger whereas the second term decreases because of the fact that the interface of merged cells is suppressed, said cells not forming more than one, and hence the number of voxels for which the second term must be calculated decreases. For a pair of given adjoining cells the competition between the first and the second term of the cost function F may yield a minimization of the cost function F and hence a merger of the cells of this pair, taking into account not only the intensity variance function and the gradient modulus function, but also the variable value of the weighting parameter $\lambda$ of the second term. For a given number of cells produced by the presegmentation, the first term of the cost function F is fixed, so that as the value of $\lambda$ is smaller, the possibility of minimizing the cost function F and of merging the cells is smaller, whereas the value of $\lambda$ is larger, the greater the possibility of minimizing the function F and merging the cells will be.

After each merger, the intensity of the resultant cell is calculated as the mean value of the intensities of the voxels of the two merged cells and the pairs of voxels of the interface of the two merged cells become normal internal voxels.

It is to be recalled that it is one of the objects of the invention to execute the segmentation operations within a period of time which is shorter than that currently known from the state of the art. Therefore, the actual segmentation step 40, utilizing the cost function F, is carried out while using specific sub-steps which are described hereinafter and which include, in order to reduce the calculation time, the formation of a first, simple histogram on the basis of the evaluation of thresholds for merging pairs of two adjoining cells in order to provide the number of pairs of cells which are merged with the same given threshold, and the formation of a second, so-called accumulated histogram, on the basis of the first, simple histogram, in order to supply the number of pairs of cells which merge with a merger threshold lower than or equal to a specific threshold. In order to illustrate this description, merely by way of example it is assumed that at the end of the presegmentation 30 20,000 classes with 50,000 interfaces have been obtained in the presegmented 3-D image.

Theoretically speaking, the segmentation 40 should include the following sub-steps:

evaluation of the cost function F before any merger, then being called $F_0$: in the first term of $F_0$ the summing function is calculated for the 20,000 cells resulting from the presegmentation, and in the second term the summing function is calculated for the 50,000 interfaces, selection for examination of a pair of two cells $C_j$, $C_k$, evaluation of the cost function F after the merger of the two cells of said pair, the cost function then being called $F_1$: in the first term of $F_1$ the sum is formed for the 20,000 cells minus one, and in the second term the sum is formed for the 50,000 interfaces minus one, determination of a merger threshold $\lambda_0(j,k)$ on the basis of the weighting parameter $\lambda$ which constitutes the threshold at which the interface between the two cells of the pair examined disappears and enables the merger of the two cells of the pair examined, said merger producing the cost function $F_1:\lambda_0(j,k)$ is defined as the value which enables cancellation of a function $E_0$ calculated as the difference between the cost functions $F_1$ and $F_0$, in which the weighting parameter is $\lambda_0(j,k)$; this is written as:

$$E_0 = F_1 - F_0 = 0 \text{ with } \lambda = \lambda_0(j,k) \tag{3}$$

Consequently, $\lambda_0(j,k)$ can be readily calculated for two specific cells $C_j$, $C_k$:#

$$\lambda_0(j \cdot k) = m_j m_k (I_j^{MOY} - I_k^{MOY})^2 / (m_j + m_k) \sum_{VBD} 1/[1 + (\|G\|)/\|G_0\|] \tag{4}$$

where $I_j^{MOY}$ and $I_k^{MOY}$ are the mean intensity values and $m_j$, $m_k$ are the numbers of voxels in the cells.

Figure 6A:
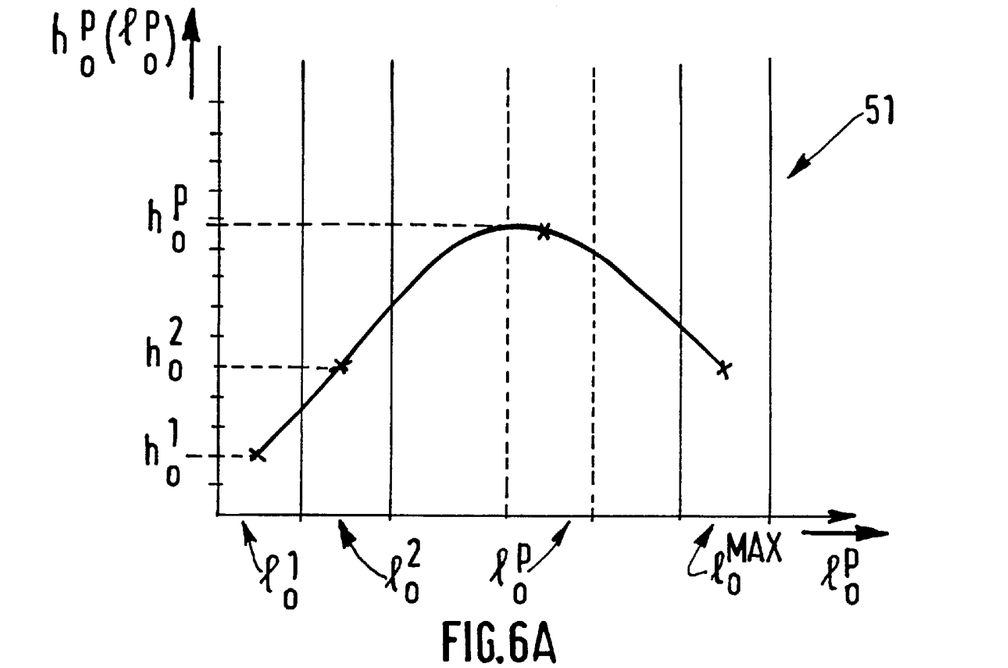
FIGS. 6A and 6B show a simple histogram and an accumulated histogram, respectively, of the weighting parameter of the cost function.
Figure 6B:
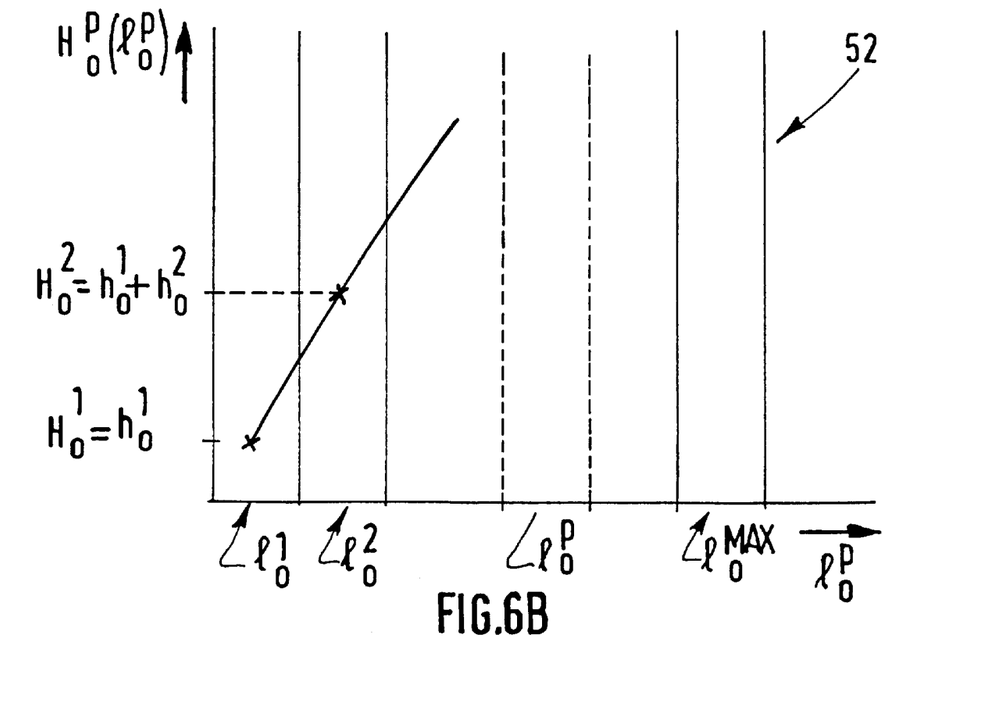

In practice the actual segmentation step 40 does not include the evaluation of a cost function F in conformity with the formules (1) or (2), because this calculation is too long. The segmentation step 40 is based on the evaluation of the merger threshold $\lambda_0(j,k)$ and includes the following sub-steps:

determination (41) of pairs of adjoining cells $C_j$, $C_k$ in the presegmented image; there are as many interfaces $BD_{jk}$ as there are pairs;

determination (42) of mean intensities $I_j^{MOY}$, $I_k^{MOY}$ and numbers $m_j$, $m_k$ of voxels of adjoining cells $C_j$, $C_k$ of the pairs;

determination (43) of as many merger thresholds $\lambda_0(j,k)$ as there are pairs of adjoining cells $C_j$, $C_k$, utilizing the formule (4);

classification (44) of the thresholds with $\lambda_0(j,k)$ from the smallest to the largest, denoted as $\lambda_0^1$ to $\lambda_0^{MAX}$;

formation of a first diagram (51) $h_0^p$ (see FIG. 6A) which is called a single histogram and is based on the fact that in practice a given number of pairs of cells show the same first term in the evaluation of the cost function F and the same second term, with the result that the cells of these pairs may be merged for the same threshold: on the abscissa the values of the thresholds $\lambda_0^1$ to $\lambda_0^{MAX}$, being numbers which can in theory lie between 1 and 50,000 if there are 50,000 interfaces, are plotted and on the ordinate there is plotted the number of the event $h_p$, that is to say the number of times $h_p$ that interfaces are found which produce $E_0=0$, where $\lambda_0^p$ is from $\lambda_0^1$ to $\lambda_2^{MAX}$ and where $1 \leq p \leq MAX$. The number of couples that can be merged with $\lambda_0^p$ is called $h_1$; $h_p$ is the number of couples that can be merged with $\lambda_0^p$, and $h_{MAX}$ is the number of pairs that can be merged with $\lambda_0^{MAX}$; the number $h_{MAX}$, corresponding to $\lambda_0^{MAX}$, is not necessarily large; it is not excluded that $h_{MAX}=0$; it appears that for given values of $\lambda_0^p$, no feasible mergers are found ($h_p=0$) whereas for other values of $\lambda_0^p$ a large number $h_p$ of feasible mergers of pairs is found. Therefore, upon the formation of the simple histogram several thousands of values of $\lambda_0^p$ may occur on the abscissa; in order to make the calculations simple and fast, the values of $\lambda_0^p$ are rearranged in slices of, for example 256 values and these slices are actually plotted on the abscissa in said simple histogram 51; the values $\lambda_0^1$ to $\lambda_0^{256}$ are thus rearranged in a slice called $l_0^1$, the values $\lambda_0^{256}$ to $\lambda_0^{511}$ being rearranged in a slice $l_0^2$, and so on until a final slice $l_0^{max}$ is formed; in each slice the numbers of events $h_p$ are added and referenced analogously as $h_0^1$ to $h_0^{max}$; thus, actually the values $h_0^p$ are plotted on the ordinate in this simple histogram 51, formation (52) of a second, so-called accumulated histogram $H_0^p$ (see FIG. 6B) which is based on the simple histogram and in which the slices determined in the simple histogram 51, from $l_0^1$ to $l_0^{max}$ are plotted on the abscissa and in which the accumulated values in each slice, from $h_0^1$ to $h_0^{max}$, are plotted on the ordinate, that is to say the numbers of events added from the first slice until a slice considered; thus, in the slice $l_0^1$ a number of events $h_0^1$, now called $H_0^1$ is arranged; in the slice $l_0^2$ a number of events $h_0^1+h_0^2$, now called $H_0^2$, is arranged, and so on until the slice $l_0^{max}$ in which a number of events is arranged which is equal to the sum of $h_0^1$ to $h_0^{max}$ or $H_0^{max}$, selective segmentation (53) of the 3-D image: in order to perform a segmentation of the 3-D image at a high speed, on the basis of the accumulated histogram (52) it is chosen, for example to perform the segmentation in steps, in each step a given number of concomitant mergers being executed in order to eliminate a given percentage of interfaces from a section, for example 10% or 15% of the interfaces; to this end, in the accumulated histogram 52 there is selected a slice $l_0^p$ which contains the desired number of events; this value of $l_0^p$ cancels the above function $E_0$ and hence minimizes the cost function F for all pairs of cells having produced a merger threshold $\lambda_0(j,k)$ in this slice; all pairs of adjoining cells are visited and the cells are merged whenever they correspond to a merger threshold $\lambda_0(j,k)$ lower than the predetermined threshold $l_0^p$, thus enabling the execution of the mergers of these pairs concomitantly with a first elimination of the desired number of interfaces; subsequently, the remaining cells are reorganized by calculating the intensity of the resultant cells as the mean value of the intensities of the original cells; for the resultant cells the terms of the relation (4) are calculated again, because the relations between the remaining cells are no longer the same as those between the initial cells; the simple histogram 51 and the accumulated histogram 52 are updated and the slice $l_0^p$ containing the desired number of occurrences is then chosen in order to merge a new percentage of, for example 10 or 15% of the pairs of cells; this operation continues until an appropriate number of cells has been reached; it can be elected to save, for example 10% or 15% of the initial cells: in the remaining cells the voxels of eliminated interfaces are normal internal voxels and the intensities are the mean intensities of merged adjoining cells.

Figure 7C:
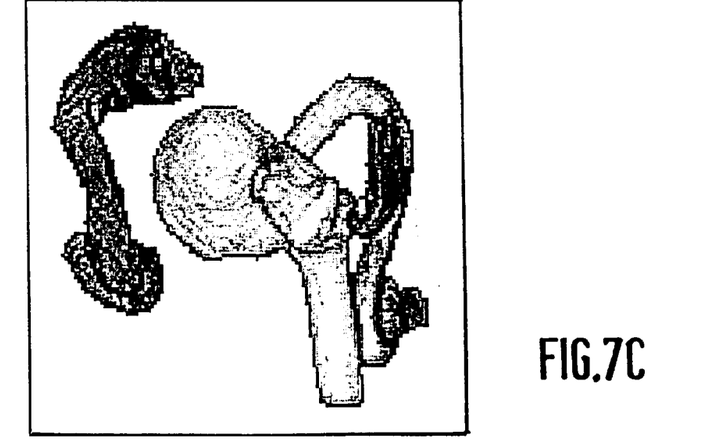

Referring to the FIGS. 1B and 7C, the segmented 3-D image can then be subjected to a reconstruction operation 60 with voluminal surface rendition, so that it can be displayed or recorded. As a result of the segmentation according to the invention, each of the vessels is reproduced with a specific intensity level which enables the vessels to be distinguished from one another and from the background.

Figure 8:
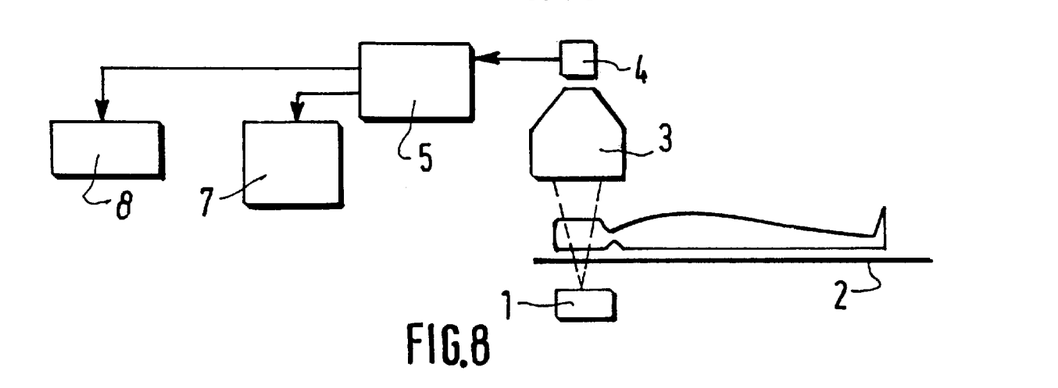
FIG. 8 shows a medical X-ray imaging apparatus.

FIG. 8 shows a digital radiography apparatus which includes an X-ray source 1, a table 2 for accommodating the patient, and an image intensifier device 3 which is coupled to a camera tube 4 which applies data to a digital image processing system 5 which includes a processor for carrying out the image processing method according to the invention. The processor includes several outputs, one output 6 of which is coupled to a monitor 7 for the display of radiographic images, or to an appropriate recording system 8. The image processing system may form an integral part of the X-ray apparatus or be installed in a remote location while being coupled thereto.

Generally speaking, the described image processing method can be used, partly or completely, by any medical imaging system, notably by X-ray apparatus such as described above for the processing of multidimensional images, with or without reconstruction of voluminal surfaces.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method for the processing of a multidimensional image which is formed by points representing objects which have an intensity which differs from one object to another, and are delimited from a background by way of their edges, the method comprising:

segmenting the image into cells relating to the background and cells relating to the objects, by applying criteria which impose that said cells have respective, substantially uniform intensities, that said cells neither intersect nor enclose any object edge, and that the object edges coincide with cell edges.

2. A method as claimed in claim 1 wherein the segmenting further comprises presegmenting the image into a first number of cells while performing a classification of the points of the image in the various cells in conformity with a criterion which is a function of intensity gradients ($\|G\|$) of said points, and actually segmenting so as to reduce the first number of cells by classifying the cells into pairs of adjoining cells ($C_j$, $C_k$) while evaluating a merger threshold ($\lambda_0(j,k)$) of the cells of the pairs as a function of the intensity variance ($\sigma^2$) and the intensity gradients ($\|G\|$) in the cells of each pair and while evaluating a specific merger threshold ($l_0^P$) below which the adjoining cells of pairs are merged in a predetermined number ($H_0(p)$) and by performing the concomitant merger of adjoining cells of pairs having intensity characteristics which lead to a merger threshold which is lower than the specific threshold.

3. A method as claimed in claim 2 wherein the presegmenting further comprises transforming the multidimensional image into a topographic image by way of intensity gradient functions of the image points while identifying ($C_i$) the cells searched in catch basins (CB) and while identifying the edges bounding said cells at watershed lines (WS) of the topographic image.

4. A method as claimed in claim 3 wherein the points of the watershed lines (WS) are collected in the adjoining catch basins (CB) which are situated to both sides of these lines, wherein the cells obtain a uniform intensity which is calculated as the mean value ($I_i^{MOY}$) of the intensity of the points within the catch basins and form a class of objects, and wherein interfaces (BD) are defined between pairs of edge points (VBD) of the pairs of adjoining cells and coincide with object edges.

5. A method as claimed in claim 2 wherein the actually segmenting further comprises:

defining a cost function (F) which comprises a first term which is a function of the intensity variance ($\sigma^2$) within the cells present in the image, and a second term which is weighted by a variable weighting factor ($\lambda$) and is a function of intensity gradients at the edge points of cells, and evaluating the merger threshold ($\lambda_0(j,k)$) in order to perform the merging of two adjoining cells ($C_j$, $C_k$) of a pair as the value of the variable weighting factor ($\lambda$) which cancels the difference ($E_0$) between the cost function ($F_0$) calculated before the merging of two cells and the cost function ($F_1$) calculated after this merger.

6. A method as claimed in claim 5 wherein the cost function is given by the formula:

$$F = \sum_{C_i} [I(X, Y) - I_i^{MOY}]^2 + \lambda \sum_{VBD} 1/[1 + (\|G\|/\|G_0\|)^2],$$

in which the first term is the intensity variance function, expressed by a first function for the summing, over all cells ($C_i$), of the squares of the differences between the intensity ($I(x,y)$) of a voxel having the co-ordinates (x,y) and the mean intensity ($I_i^{MOY}$) in the cells ($C_i$) whereto this voxel belongs, and in which the second term is weighted by the weighting factor ($\lambda$) and is formed by a second function for the summing, over all pairs of voxels situated at the interface of the cells, of a specific measure which takes into account the modulus of the normalized gradient ($\|G\|/\|G_0\|$) of the voxels of these interface pairs, and wherein the merger threshold ($\lambda_0(j,k)$) enabling the merger of two adjoining cells ($C_j$, $C_k$) to be performed is evaluated as a function of the differences of the mean intensities ($I_j^{MOY}$, $I_k^{MOY}$) of two cells to be merged, and of the number of points ($m_j$, $m_k$) in these cells, and of a second summing function in conformity with a formula:

$$\lambda_0(j \cdot k) = m_j m_k (I_j^{MOY} - I_k^{MOY})^2 / (m_j + m_k) \sum_{VBD} 1/[1 + (\|G\|)/\|G_0\|].$$

7. A method as claimed in claim 5 wherein evaluating the specific merger threshold ($l_0^P$), enabling the concomitant execution of several mergers of two adjoining cells ($C_j$, $C_k$), further comprises:

determination of merger thresholds ($\lambda_0(j,k)$) for the cells of all pairs of cells of the image, classification of these values ($\lambda_0(j,k)$) of the merger threshold according to increasing values ($\lambda_0^P$), the number of said values being at the most equal to the total number of interfaces present in the presegmented image ($1 \leq \lambda_0^P \leq \lambda_0^{MAX}$), determination of slices ($l_0^P$) of these values of merger threshold factors ($\lambda_0^P$), classified according to increasing values, formation of a simple histogram of the number ($h_0^P$) of merger events for adjoining cells in each respective slice ($l_0^P$) of the merger threshold values ($\lambda_0(j,k)$), formation of an accumulated histogram while inscribing in each slice ($l_0^P$) the accumulated sum ($H_0^P$) of the number of said events ($h_0^P$) from the first slice ($l_0^1$) until the slice considered ($l_0^P$), for all slices ($l_0^1 l_0^{MAX}$) of the merger threshold values ($\lambda_0^P$), and definition of said specific merger threshold as the slice ($l_0^P$) which comprises the number of events ($H_0^P$) corresponding to a predetermined number of concomitant mergers.

8. A method as claimed in claim 7 further comprising, after evaluating the specific merger threshold, selecting a predetermined number of interfaces to be concomitantly eliminated between adjoining cells of pairs, visiting the pairs of adjoining cells of the image and merging adjoining cells of pairs whenever the merger threshold relating to these cells ($\lambda_0(j,k)$) is below said specific merger threshold ($l_0^P$).

9. The method of claim 3 wherein the actually segmenting further comprises:

defining a cost function (F) which comprises a first term which is a function of the intensity variance ($\sigma^2$) within the cells present in the image, and a second term which is weighted by a variable weighting factor ($\lambda$) and is a function of intensity gradients at the edge points of cells, and evaluating the merger threshold ($\lambda_0(j,k)$) in order to perform the merging of two adjoining cells ($C_j$, $C_k$) of a pair as the value of the variable weighting factor ($\lambda$) which cancels the difference ($E_0$) between the cost function ($F_0$) calculated before the merging of two cells and the cost function ($F_1$) calculated after this merger.

10. The method of claim 9 wherein the cost function is given by the formula:

$$F = \sum_{C_i} [I(X, Y) - I_i^{MOY}]^2 + \lambda \sum_{VBD} 1/[1 + (\|G\|/\|G_0\|)^2],$$

in which the first term is the intensity variance function, expressed by a first function for the summing, over all cells ($C_i$), of the squares of the differences between the intensity ($I(x,y)$) of a voxel having the co-ordinates (x,y) and the mean intensity ($I_i^{MOY}$) in the cells ($C_i$) whereto this voxel belongs, and in which the second term is weighted by the weighting factor ($\lambda$) and is formed by a second function for the summing, over all pairs of voxels situated at the interface of the cells, of a specific measure which takes into account the modulus of the normalized gradient ($\|G\|/\|G_0\|$) of the voxels of these interface pairs, and wherein the merger threshold ($\lambda_0(j,k)$) enabling the merger of two adjoining cells ($C_j$, $C_k$) to be performed is evaluated as a function of the differences of the mean intensities ($I_j^{MOY}$, $I_k^{MOY}$) of two cells to be merged, and of the number of points ($m_j$, $m_k$) in these cells, and of a second summing function in conformity with a formula:

$$\lambda_0(j \cdot k) = m_j m_k (I_j^{MOY} - I_k^{MOY})^2 / (m_j + m_k) \sum_{VBD} 1/[1 + (\|G\|)/\|G_0\|].$$

11. The method of claim 10 wherein evaluating the specific merger threshold ($l_0^P$), enabling the concomitant execution of several mergers of two adjoining cells ($C_j$, $C_k$), further comprises:

determination of merger thresholds ($\lambda_0(j,k)$) for the cells of all pairs of cells of the image, classification of these values ($\lambda_0(j,k)$) of the merger threshold according to increasing values ($\lambda_0^P$), the number of said values being at the most equal to the total number of interfaces present in the presegmented image ($1 \leq \lambda_0^P \leq \lambda_0^{MAX}$), determination of slices ($l_0^P$) of these values of merger threshold factors ($\lambda_0^P$), classified according to increasing values, formation of a simple histogram of the number ($h_0^P$) of merger events for adjoining cells in each respective slice ($l_0^P$) of the merger threshold values ($\lambda_0(j,k)$), formation of an accumulated histogram while inscribing in each slice ($l_0^P$) the accumulated sum ($H_0^P$) of the number of said events ($h_0^P$) from the first slice ($l_0^1$) until the slice considered ($l_0^P$), for all slices ($l_0^1$ $l_0^{MAX}$) of the merger threshold values ($\lambda_0^P$), and definition of said specific merger threshold as the slice ($l_0^P$) which comprises the number of events ($H_0^P$) corresponding to a predetermined number of concomitant mergers.

12. A method as claimed in claim 1 further comprising, prior to segmenting, acquiring two-dimensional (2-D) intensity images of a volume and reconstructing a noisy three-dimensional (3-D) image, and subsequent to segmenting of the three-dimensional image into object cells and background cells, reconstructing a three-dimensional image by means of a method utilizing voluminal renditions where each object is attributed the respective individual intensity of the corresponding cell.

13. A method as claimed in claim 1 wherein the multidimensional image is a medical vascular image.

14. A medical imaging apparatus comprising:

an image acquisition system for providing data of an image, and an image processing system which has access to the data of the image and to an image display system and comprises a processor for carrying out an image processing method as claimed in claim 1.

15. A medical imaging apparatus as claimed in claim 14 wherein the image acquisition system further comprises an x-ray source.

* * * * *